US012696278B2

(12) United States Patent　　(10) Patent No.:　US 12,696,278 B2
Jia et al.　　　　　　　　　　　(45) Date of Patent:　　Jul. 28, 2026

(54) METHOD FOR TRANSMITTING UPLINK CONTROL INFORMATION, COMMUNICATION APPARATUS, AND RELATED DEVICE

(71) Applicant: HUAWEI TECHNOLOGIES CO., LTD., Shenzhen (CN)

(72) Inventors: Qiong Jia, Shanghai (CN); Jiayin Zhang, Shanghai (CN); Weiwei Fan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 562 days.

(21) Appl. No.: 18/169,918

(22) Filed: Feb. 16, 2023

(65) Prior Publication Data

US 2023/0199777 A1　　Jun. 22, 2023

Related U.S. Application Data

(63) Continuation of application No. PCT/CN2020/109643, filed on Aug. 17, 2020.

(51) Int. Cl.
　*H04W 72/0446*　　(2023.01)
　*H04W 72/0453*　　(2023.01)
　*H04W 72/21*　　　(2023.01)

(52) U.S. Cl.
　CPC ....... *H04W 72/21* (2023.01); *H04W 72/0446* (2013.01); *H04W 72/0453* (2013.01)

(58) Field of Classification Search
　CPC ............. H04W 72/0453; H04W 72/21; H04W 72/0446; H04L 5/0098; H04L 27/0006; H04L 5/001; H04L 5/0053
　See application file for complete search history.

(56) References Cited

U.S. PATENT DOCUMENTS

2013/0114577 A1 *　5/2013　Cai ....................... H04L 5/0053
　　　　　　　　　　　　　　　　　　　　　　　370/336
2017/0013611 A1 *　1/2017　Dinan ................. H04W 52/146
　　　　　　　　　　　(Continued)

FOREIGN PATENT DOCUMENTS

CN　　102164414 A　　8/2011
CN　　105900506 A　　8/2016
CN　　106160973 A　　11/2016
WO　　2019139438 A1　　7/2019

OTHER PUBLICATIONS

Huawei, HiSilicon, On NR carrier aggregation. 3GPP TSG RAN WG1 Meeting #90, Prague, Czech Republic, Aug. 21-25, 2017, R1-1712160, 11 pages.

(Continued)

*Primary Examiner* — Brian D Nguyen

(57)　　　　　　ABSTRACT

The technology of this application relates to a method for transmitting uplink control information. The method includes a network device sending first signaling in a first cell to a terminal device. The terminal device may send uplink control information in a second cell based on the first signaling. The uplink control information may be uplink control information corresponding to the first cell and/or uplink control information corresponding to a third cell. The third cell is a cell other than the first cell and the second cell. According to the method provided in this application, a cell for sending the uplink control information may be dynamically configured for the terminal device, and can improve communication efficiency.

20 Claims, 8 Drawing Sheets

(56)  References Cited

U.S. PATENT DOCUMENTS

| | | | | |
|---|---|---|---|---|
| 2018/0006791 | A1 | 1/2018 | Marinier et al. | |
| 2018/0368114 | A1* | 12/2018 | Chen | H04W 24/10 |
| 2019/0305867 | A1* | 10/2019 | Tseng | H04J 11/0079 |
| 2022/0046522 | A1* | 2/2022 | Kim | H04W 76/34 |
| 2022/0312519 | A1* | 9/2022 | Xu | H04L 5/0098 |
| 2022/0330155 | A1* | 10/2022 | Cheng | H04W 52/0235 |
| 2023/0164792 | A1* | 5/2023 | Cheng | H04W 72/23 |
| | | | | 370/329 |

OTHER PUBLICATIONS

3GPP TS 38.212 V16.2.0 (Jun. 2020), 3rd Generation Partnership Project; Technical Specification Group Radio Access Network; NR; Multiplexing and channel coding (Release 16), 151 pages.

International Search Report and Written Opinion issued in PCT/CN2020/109643, dated May 13, 2021, 10 pages.
Ericsson, Enhancements to PUCCH-UCI and PHR, 3GPP TSG RAN WG2 #108 R2-1915866, Internet URL: https://www.3gpp.org/ftp/tsg_ran/WG2_RL2/TSGR2_108/Docs/R2-1915866.zip>, Nov. 22, 2019, 6 pages.
Notice of Reasons for Rejection for Japanese Application No. 2023-511987 dated Feb. 26, 2024, 11 pages.
LG Electronics: "Discussion on carrier aggregation for NR", 3GPP Draft; R1-1717973, Oct. 8, 2017, XP051341157, total 9 pages.
Ericsson: "Improved transmission mechanism for PUCCH-UCI", 3GPP Draft; R2-1913500, Oct. 3, 2019, XP051804295, total 4 pages.
VIVO: "Cross-carrier scheduling with different numerologies", 3GPP Draft; R1-1904112, Apr. 7, 2019, XP051699482, total 6 pages.
European Search Report for EP Application No. 20949740 dated Jul. 7, 2023, 9 pages.

* cited by examiner

Communication apparatus 1100

Processor 1101

Memory 1102

Transceiver 1103

Antenna 1104

Antenna

Control circuit

1211

1200

Memory

Processor

1212

Input/Output apparatus

METHOD FOR TRANSMITTING UPLINK CONTROL INFORMATION, COMMUNICATION APPARATUS, AND RELATED DEVICE

CROSS-REFERENCE TO RELATED APPLICATIONS

This application is a continuation of International Application No. PCT/CN2020/109643, filed on Aug. 17, 2020, the disclosure of which is hereby incorporated by reference in its entirety.

TECHNICAL FIELD

This application relates to the field of communication technologies, and in particular, to a method for transmitting uplink control information, a communication apparatus, and a related device.

BACKGROUND

New Radio (NR) supports carrier aggregation (CA), that is, a plurality of contiguous or non-contiguous component carriers (CC) are aggregated into a larger bandwidth, to fully utilize resources on the component carriers, thereby improving data transmission rates of users and reducing delays. The CA includes a primary serving cell (primary cell, PCell) and a secondary cell (SCell). The primary serving cell works on a primary carrier. A terminal performs an initial connection establishment procedure or starts a connection re-establishment procedure in the primary serving cell. In a handover procedure, the cell is designated as a primary cell.

A terminal device usually sends uplink control information in the primary cell. If a network state changes, and the uplink control information cannot be sent in the primary cell, sending of the uplink control information may consequently fail.

SUMMARY

This application provides a method for transmitting uplink control information, a communication apparatus, and a related device, to provide a more flexible method for sending uplink control information.

According to a first aspect, this application provides a method for transmitting uplink control information. The method includes: A network device sends first signaling in a first cell to a terminal device. The first signaling indicates a second cell in which the terminal device sends uplink control information, the uplink control information is uplink control information corresponding to the first cell and/or uplink control information corresponding to a third cell, and the third cell is a cell other than the first cell and the second cell. The network device receives the uplink control information from the second cell.

According to a second aspect, this application provides a method for transmitting uplink control information. The method includes:

A terminal device receives first signaling in a first cell from a network device. The first signaling indicates a second cell in which the terminal device sends uplink control information, the uplink control information is uplink control information corresponding to the first cell and/or uplink control information corresponding to a third cell, and the third cell is a cell other than the first cell and the second cell.

The terminal device sends the uplink control information in the second cell to the network device.

Because the network device may flexibly indicate a cell configured to send uplink control information, even if original cell quality does not satisfy a requirement, the terminal device can still send the uplink control information in the flexibly indicated cell, to ensure that the uplink control information can be sent in time, thereby improving communication efficiency.

In a possible implementation, the first signaling includes an identifier of the second cell. In this implementation, that the cell used by the terminal device for sending the uplink control information is directly indicated is a simple implementation.

In another possible implementation, cells of the network device are divided into at least two cell groups. For example, the network device corresponds to a first cell group and a second cell group. The first cell is in the first cell group, and the second cell is in the second cell group. The first signaling includes an identifier of the second cell group. The second cell is a default cell configured in the second cell group for sending the uplink control information. Therefore, the cell configured to send the uplink control information is indicated based on the cell group, so that more cells can be indicated without increasing signaling overheads, to adapt to a scenario in which a cell group exists. Optionally, the cell group may be divided based on the default cell configured to transmit the uplink control information, and default cells configured to transmit the uplink control information are different in different cell groups.

Optionally, the third cell is in the first cell group. Therefore, the terminal device receives the first signaling in a current cell, and may send, in a cell indicated by the first signaling, uplink control information of a cell belonging to a same cell group as the current cell. Alternatively, optionally, the third cell is in the second cell group. Therefore, the terminal device receives the first signaling in a current cell, and may send, in a cell indicated by the first signaling, uplink control information of a cell belonging to a cell group different from a cell group to which the current cell belongs. In different implementations, the first signaling further includes identification information of the third cell or a third cell group, or the identification information of the third cell or the third cell group may be default identification information. The terminal device is indicated to send the uplink control information corresponding to the third cell, so that the terminal device may send uplink control information of a plurality of cells to the network device or separately send the third cell, which is also a flexible manner, and can adapt to different scenarios.

In still another possible implementation, the network device corresponds to a first cell group and a second cell group. A cell used by the terminal device for transmitting the uplink control information is configured for each cell group. The first cell is in the first cell group. The first signaling includes a first indication, the first indication indicates the terminal device to transmit the uplink control information in the first cell group, and the second cell is a default cell configured in the first cell group for sending the uplink control information. Alternatively, the first indication indicates the terminal device to send the uplink control information in a cell group other than the first cell group, and the second cell is a cell configured in the cell group other than the first cell group for transmitting the uplink control information.

The first indication indicates the uplink control information to indicate whether to send the uplink control information in a cross-group manner, so that signaling overheads can be reduced.

In still another possible implementation, the network device corresponds to M cell groups, the M cell groups include N cell pairs, and one cell pair includes at least two cell groups in the M cell groups. M is an integer greater than 2, and N is an integer greater than 1. The first cell is in the first cell group. The first signaling includes a second indication, the second indication indicates the terminal device to transmit the uplink control information of the terminal device in the first cell group, and the second cell is a default cell configured in the first cell group for transmitting the uplink control information. Alternatively, the second indication indicates the terminal device to send the uplink control information of the terminal device in another cell group in a cell pair to which the first cell group belongs, and the second cell is a default cell configured in the another cell group for transmitting the uplink control information.

A manner of further grouping pairs for a cell group may be used, to cover more cells, and a second indication is used for performing cross-group indication in each pair of cell groups, thereby reducing signaling overheads and improving communication efficiency.

In a possible implementation, the second cell includes at least two active bandwidth parts (BWP), the first signaling further includes a BWP identifier, and the BWP identifier indicates a BWP configured in the second cell for transmitting the uplink control information of the terminal device. Based on indication of a BWP granularity, a cell for transmitting uplink control information is dynamically indicated in a scenario in which the second cell includes a plurality of BWPs, thereby improving indication precision and transmission resource usage efficiency.

In a possible implementation, the first signaling is downlink control information (DCI).

With reference to the method provided in the first aspect, in a possible implementation, the method further includes:

The network device sends second signaling to the terminal device. The second signaling indicates a first time-frequency resource configured in the second cell for transmitting the uplink control information, and the first time-frequency resource is different from an initial time-frequency resource configured in the second cell for transmitting the uplink control information.

With reference to the method provided in the second aspect, in a possible implementation, the method further includes:

The terminal device receives second signaling from the network device. The second signaling indicates a first time-frequency resource configured in the second cell for transmitting the uplink control information, and the first time-frequency resource is different from an initial time-frequency resource configured in the second cell for transmitting the uplink control information.

In a possible implementation, the second signaling is downlink control information (DCI) and/or radio resource control (RRC) signaling.

A time-frequency resource that is for transmitting the uplink control information and that is different from the initial time-frequency resource is configured, so that a resource conflict can be avoided, and transmission efficiency can be improved.

In a scenario of an unlicensed band, with reference to the method provided in the first aspect, in a possible implementation, the second cell is a cell in which the terminal device monitors a channel, and when it is detected that the channel is idle, the second cell is used by the terminal device to send the uplink control information.

With reference to the method provided in the second aspect, in a possible implementation, the terminal device monitors a channel in the second cell, and sends the uplink control information in the second cell when it is detected that the channel is idle.

In a scenario of an unlicensed band, due to impact of an LBT mechanism, it is possible that uplink control information cannot be sent in an originally configured cell because the cell is busy. The method provided in this application provides more sending opportunities for the terminal device, so that the terminal device does not need to wait until the originally configured cell is idle before performing sending, which ensures that the uplink control information can be sent in time, thereby improving system performance.

According to a third aspect, this application provides a method for transmitting uplink control information, including:

A network device sends first signaling in a first cell to a terminal device, where the first signaling indicates the terminal device to send uplink control information corresponding to a second cell, and the first cell and the second cell belong to different cell groups.

The network device receives the uplink control information in the first cell from the terminal device.

According to a fourth aspect, this application provides a method for transmitting uplink control information. The method includes:

A terminal device receives first signaling in a first cell from a network device. The first signaling indicates the terminal device to transmit uplink control information corresponding to a third cell, and the second cell and the third cell belong to different cell groups.

The terminal device sends the uplink control information in the second cell to the network device.

The terminal device is indicated, in a current cell in which the downlink control information is sent, to send uplink control information corresponding to a cell in another cell group, so that the network device can learn of uplink control information of a needed cell in time and perform corresponding network planning, thereby optimizing communication performance.

With reference to the method according to the third aspect or the fourth aspect, in a possible implementation, the first signaling includes an identifier of the second cell.

With reference to the method according to the third aspect or the fourth aspect, in a possible implementation, the cell group is divided based on the default cell configured to transmit the uplink control information, and default cells configured to transmit the uplink control information are different in different cell groups.

According to a fifth aspect, an embodiment of this application provides a communication apparatus, capable of performing the method described in any possible implementation of the first aspect to the fourth aspect. The apparatus includes modules, units, or components configured to perform the foregoing method. The modules or units included in the apparatus may be implemented by software and/or hardware. For example, the apparatus may be a terminal, a network device, a server, or a centralized controller, or a chip, a chip system, or a processor that can support a terminal, a network device, a server, or a centralized controller in implementing the foregoing method.

According to a sixth aspect, an embodiment of this application provides a communication apparatus, including a processor. The processor is coupled to a memory, the memory is configured to store a program or instructions, and when the program or the instructions is or are executed by the processor, the apparatus is enabled to implement the method described in any possible implementation of the first aspect to the fourth aspect.

In a possible implementation, the communication apparatus is a network device.

In another possible implementation, the communication apparatus is a terminal device.

According to a seventh aspect, an embodiment of this application provides a computer-readable storage medium, storing a computer program or instructions. When the computer program or instructions is or are executed, a computer is enabled to perform the method described in any possible implementation of the first aspect to the fourth aspect.

According to an eighth aspect, an embodiment of this application provides a computer program product, including computer program code. When the computer program code is run on a computer, the computer is enabled to perform the method described in any possible implementation of the first aspect to the fourth aspect.

According to a ninth aspect, an embodiment of this application provides a chip, including a processor. The processor is coupled to a memory, the memory is configured to store a program or instructions, and when the program or the instructions is or are executed by the processor, the chip is enabled to implement the method described in any possible implementation of the first aspect to the fourth aspect.

DESCRIPTION OF EMBODIMENTS

The following describes technical solutions of this application with reference to the accompanying drawings.

The technical solutions in embodiments of this application may be applied to various communication systems, for example, a long term evolution (LTE) system, a 5th generation (5G) system, a new radio (NR) system, or another communication system that may appear in the future.

Figure 1:
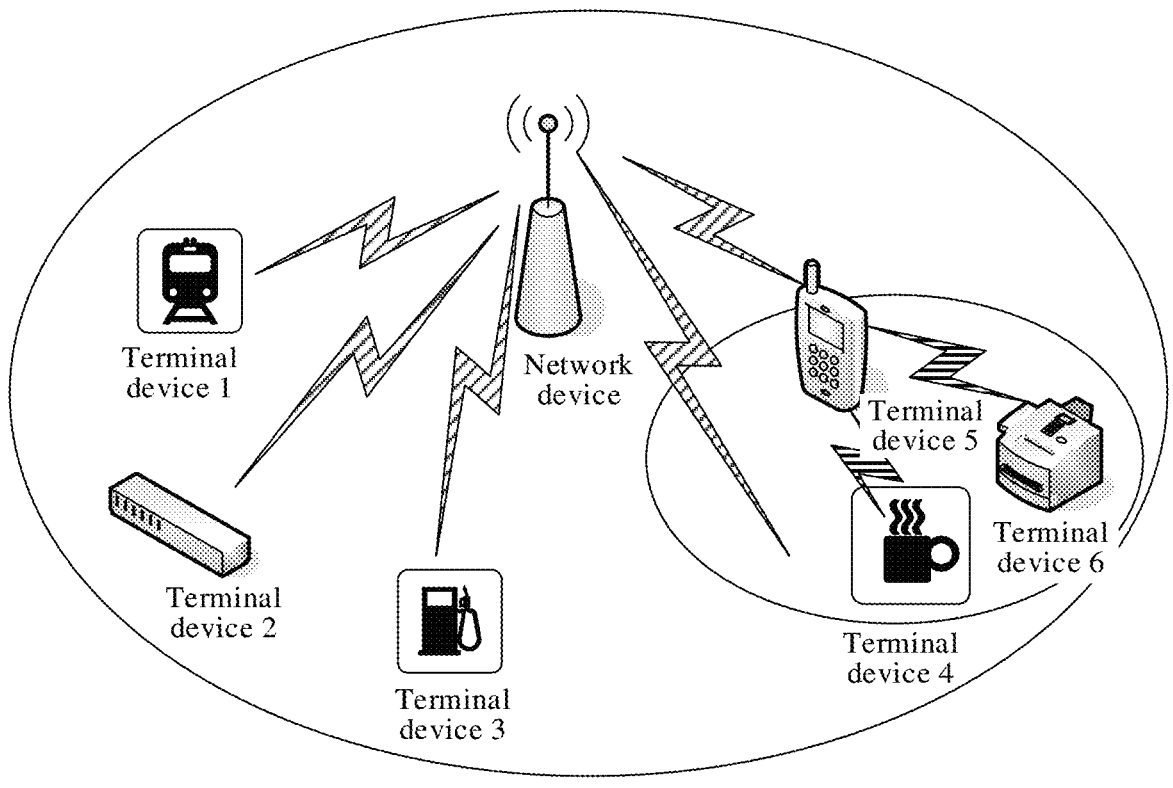
FIG. 1 is an example schematic diagram depicting a network structure according to an embodiment of this application.

FIG. 1 is a schematic diagram of a communication system applicable to this application. As shown in FIG. 1, a communication system 100 may include one or more network devices (one network device 110 shown in the figure), and one or more terminals (terminal devices 1 to 6 shown in the figure) communicating with the one or more network devices.

A terminal device in embodiments of this application may also be referred to as user equipment (UE), an access terminal, a subscriber unit, a subscriber station, a mobile station, a mobile console, a remote station, a remote terminal, a mobile device, a user terminal, a terminal, a wireless communication apparatus, a user agent, a user apparatus, or the like. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in embodiments of this application.

A network device in embodiments of this application may be a device configured to communicate with a terminal device. For example, the network device may be a base station, an evolved NodeB (eNodeB), a transmission reception point (TRP), a next generation NodeB (gNB) in a 5G mobile communication system, a base station in a future mobile communication system, or an access node in a Wi-Fi system. For another example, the network device may alternatively be a module or a unit that completes some functions of the base station. For example, the network device may be a central unit (CU) or a distributed unit (DU). For still another example, the network device may alternatively be a radio controller, a relay station, an access point, a vehicle-mounted device, a wearable device, or an access network device in another future evolved communication system in a cloud radio access network (CRAN) scenario. A specific technology and a specific device form that are used by the network device are not limited in this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry instructions and/or data.

Before the method in this application is described, several descriptions are first provided.

1. In this application, uplink control information (UCI) carries control information irrelevant to uplink data, and is mainly for obtaining a status of a downlink channel measured by the terminal and selecting a proper modulation and coding scheme (MCS) and rank adaptation for an uplink channel. The UCI may include information such as a hybrid automatic repeat request (HARQ) acknowledgment of a downlink data packet by the terminal device, channel state information (CSI), and an uplink scheduling request indicator (SRI).

2. Cell: Cells include a primary cell (PCell) and a secondary cell (SCell). The primary serving cell works on a primary carrier, and the primary cell is a cell in which the terminal device performs an initial connection establishment procedure or a cell in which a connection re-establishment procedure is started, or is indicated as a primary cell in a handover procedure. The secondary cell works on a secondary carrier, and is a cell configured for the terminal device by using radio resource control (RRC) signaling, so that more radio resources can be provided for the terminal device. For example, in some scenarios, a cell may be a cell in a master cell group (MCG) and a cell in a secondary cell group (SCG). There is a PCell in the MCG, and there is a primary secondary cell (Primary SCG Cell, PSCell) in the SCG. The primary secondary cell is a cell to which the terminal device initiates initial access in the SCG. In some scenarios, the PCell and the PSCell are collectively referred to as a special cell, namely, an SPCell, or also referred to as a special cell.

In an example, an uplink control channel (e.g., physical uplink control channel (PUCCH)) is transmitted in a primary cell, uplink control information carried on the uplink control channel is also transmitted in the primary cell, and uplink control information corresponding to a secondary cell is transmitted in the primary cell instead of the secondary cell. In some other examples, for example, in a scenario in which a primary secondary cell exists, an uplink control channel is transmitted in the primary secondary cell, and uplink control information carried on the uplink control channel is also transmitted in the primary secondary cell. In this case, uplink control information corresponding to a secondary cell is transmitted in the primary secondary cell instead of the secondary cell. After the primary cell or the secondary cell is determined, the network device configures, for each cell, a cell used by the terminal device for sending uplink control information. In the foregoing example, the cell for sending uplink control information may be referred to as an uplink control channel cell (PUCCH cell). If the PUCCH cell is a primary cell, the cell may also be referred to as a primary uplink control channel cell (primary PUCCH cell). If the PUCCH cell is a primary secondary cell, the cell may also be referred to as a primary secondary uplink control channel cell (primary secondary PUCCH cell, PS PUCCH cell). If the PUCCH cell is a secondary cell, the cell may also be referred to as a secondary uplink control channel cell (PUCCH SCell). It may be understood that the primary PUCCH cell, the PUCCH SCell, or the PS PUCCH cell is merely a naming example, and is not intended to limit the method in this application. Unless otherwise specified, in this application, all cells for sending uplink control information are collectively referred to as a PUCCH cell.

3. PUCCH cell group: A PUCCH cell group includes at least two cells, and the at least two cells send uplink control information of the terminal device in a same PUCCH cell. In other words, if a plurality of cells are initially configured to send uplink control information of the terminal device in a same PUCCH cell, the plurality of cells belong to one PUCCH cell group. Unless otherwise specified, the PUCCH cell group in this application is referred to as a cell group for short.

Figure 3:
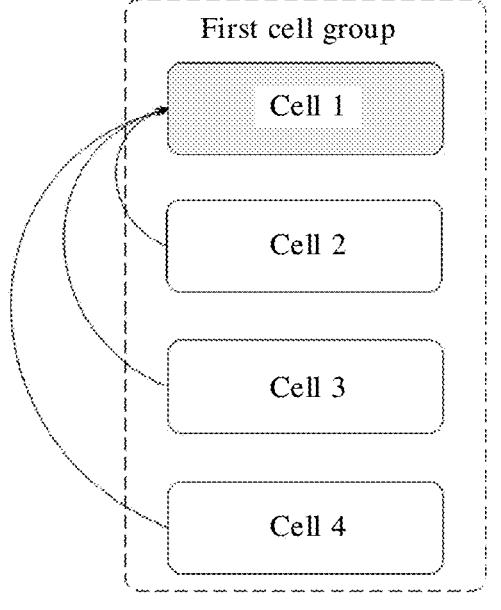
FIG. 3 is an example schematic diagram of a cell group according to an embodiment of this application.
Figure 3:
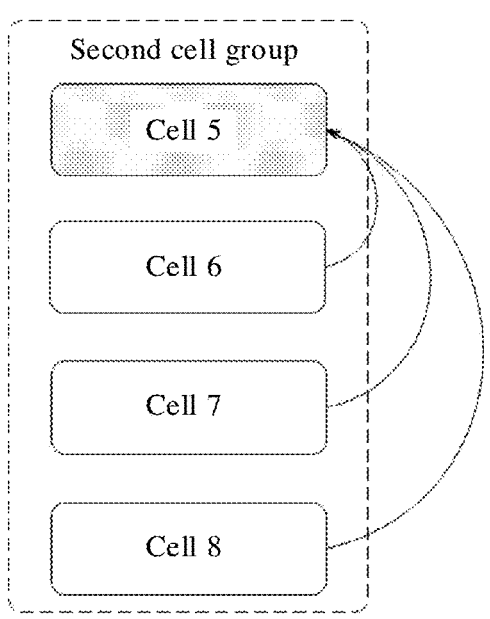

Referring to FIG. 3, a first cell group includes cells 1 to 4. The cell 1 is a PUCCH cell, which means that uplink control information corresponding to cells in the first cell group is sent in the cell 1. Using the cell 2 as an example, the terminal device sends uplink control information corresponding to the cell 2 in the cell 1 instead of the cell 2. As shown in FIG. 3, a similar manner is also used for the cell 3 and the cell 4. A second cell group includes cells 5 to 8. The cell 5 is a PUCCH cell, which means that uplink control information corresponding to cells in the second cell group is sent in the cell 5. Using the cell 6 as an example, the terminal device sends uplink control information corresponding to the cell 6 in the cell 5 instead of the cell 6. As shown in FIG. 3, a similar manner is also used for the cell 7 and the cell 8.

The cell group may be referred to as a PUCCH group, or in some embodiments, the cell group may also be referred to as a PUCCH cell group. It may be understood that the PUCCH group or the PUCCH cell group is merely a naming example, and is not intended to limit the method in this application.

Figure 4A:
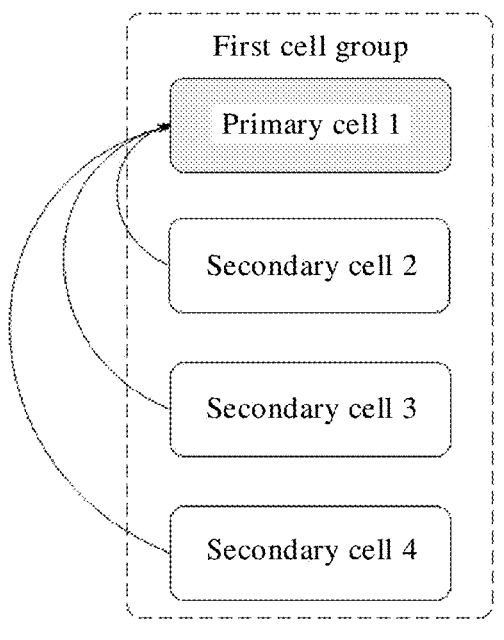
FIG. 4a and FIG. 4b are example schematic diagrams of a primary cell and a secondary cell according to an embodiment of this application.
Figure 4A:
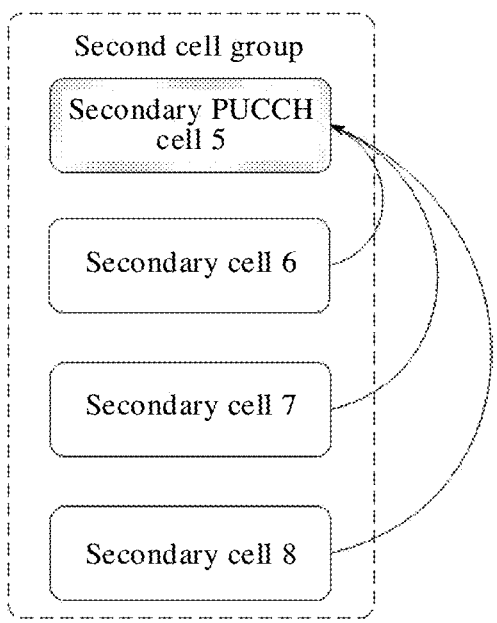

In a scenario in which a primary cell, a secondary cell, and a primary secondary cell are combined, if a PUCCH cell is a primary cell, a cell group to which the PUCCH cell belongs is a primary uplink control channel group (primary PUCCH group), if a PUCCH cell is a primary secondary cell, a cell group to which the PUCCH cell belongs is a primary secondary uplink control channel group (primary secondary PUCCH group), and if a PUCCH cell is a secondary cell (PUCCH SCell), a cell group to which the PUCCH cell belongs is a secondary uplink control channel group (secondary PUCCH group). In some scenarios, the primary PUCCH group and the primary secondary PUCCH group may also be collectively referred to as a primary PUCCH group. Referring to FIG. 4a, in this example, a first cell group is a primary PUCCH group, a cell 1 is a primary cell, cells 2 to 4 are secondary cells, the primary cell 1 is a PUCCH cell, and uplink control information corresponding to the secondary cells 2 to 4 is sent in the primary cell 1. A second cell group is a secondary PUCCH group, cells 6 to 8 are secondary cells, a secondary cell 5 is a PUCCH cell, and uplink control information corresponding to the secondary cells 6 to 8 is sent in the secondary cell 5.

Figure 4B:
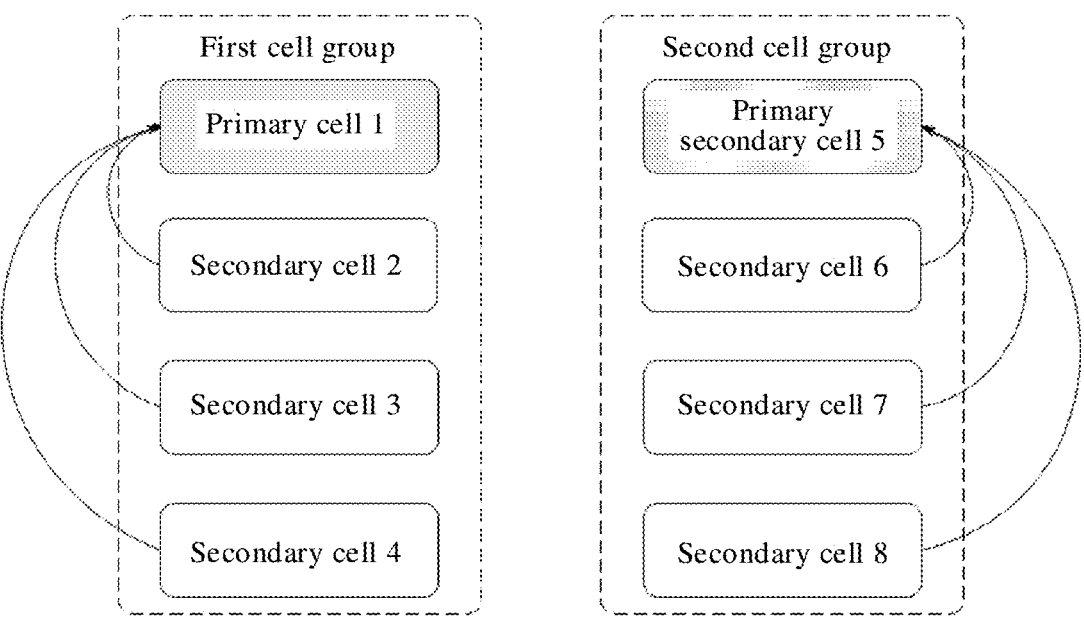

Referring to FIG. 4b, in this example, a first cell group is a primary PUCCH group, a cell 1 is a primary cell, cells 2 to 4 are secondary cells, the primary cell 1 is a PUCCH cell, and uplink control information corresponding to the secondary cells 2 to 4 is sent in the primary cell 1. A second cell group is a primary secondary PUCCH group, a cell 5 is a primary secondary cell, cells 6 to 8 are secondary cells, the primary secondary cell 5 is a PUCCH cell, and uplink control information corresponding to the secondary cells 6 to 8 is sent in the primary secondary cell 5.

It should be noted that a grouping manner of cells may be explicit or implicit. During implementation, cells may not be explicitly divided into groups. However, because several cells have commonality, similar operations may be performed on cells that have commonality. It may be understood that the cell group is merely an example of this application, and is not intended to limit the method in this application.

4. PUCCH resource: A PUCCH resource refers to a resource that is on a PUCCH and that is used for sending the uplink control information, and specifically includes a time domain resource and/or a frequency domain resource. The network device configures an initial PUCCH resource for a PUCCH cell. A cell A is used as an example. If a PUCCH cell B is configured for the cell A, and an initial PUCCH resource has been configured for the PUCCH cell B, the terminal device sends uplink control information corresponding to the cell A on the initial PUCCH resource of the PUCCH cell B. If the PUCCH cell includes a plurality of active BWPs, the PUCCH resource further includes indication information for the BWPs, to enable the terminal device to determine a specific BWP on which the uplink control information is sent in the PUCCH cell. In some scenarios, the PUCCH resource may also be referred to as a UCI resource or a time-frequency resource. It may be understood that the PUCCH resource or the UCI resource is merely a naming example, and is not used to limit the method in this application.

In some scenarios, if communication quality of a PUCCH cell is poor, and a mechanism of sending uplink control information in an initially configured PUCCH cell is depended on, consequently, the uplink control information fails to adapt to a dynamic change of a network, and the uplink control information cannot be efficiently transmitted, resulting in a failure in ensuring communication efficiency.

In addition, in an unlicensed scenario, a communication apparatus usually needs to use/share a radio resource in a contention manner. Specifically, before sending a signal, the terminal device first monitors whether a carrier is idle. If the carrier is in a busy state, the terminal device cannot send the signal. In other words, the terminal device cannot send the signal in a cell corresponding to the carrier. Such a monitoring-before-sending mechanism is referred to as listen before talk (LBT). The LBT mechanism is also applicable to a PUCCH cell. Once a PUCCH cell originally configured for the terminal device is busy, the uplink control information consequently cannot be sent at all. In this case, the terminal device can only continuously monitor a carrier of the initially configured PUCCH cell, and send the uplink control information only when the carrier is idle. In this way, it takes a long time for the terminal device to send the uplink control information, which reduces communication efficiency. It should be noted that, in the following, corresponding to the LBT mechanism, idleness or busyness of a carrier may not be specifically distinguished from idleness or busyness of a cell when the method in this application is described. It is mainly considered that the carrier usually corresponds to the cell, idleness of the carrier is equivalent to idleness of the cell, and busyness of the carrier is equivalent to busyness of the cell.

Therefore, this application provides a plurality of methods to resolve this problem. The network device may dynamically notify the terminal device of a cell that is available for sending the uplink control information, so that when a network state and network quality of an initially configured PUCCH cell for transiting the uplink control information do not satisfy communication requirements, the uplink control information may be sent through the cell dynamically notified by the network device, thereby ensuring communication quality and improving communication efficiency.

Particularly, in an unlicensed scenario, even if the terminal device detects, in a configured cell for transmitting uplink control information, that a corresponding carrier is busy, the terminal device may attempt to perform LBT in a cell dynamically notified by the network device, and send the uplink control information in a cell in which idleness is detected. According to the method in this application, in an unlicensed scenario, more sending opportunities can be provided for the terminal device to send the uplink control information, and a mechanism of sending the uplink control information is optimized, thereby ensuring that the uplink control information can be sent in time.

The following describes the methods provided in this application. It should be understood that in the following described method embodiments, only an example in which execution bodies are a network device and a terminal device is used. The network device may alternatively be replaced with a chip disposed in the network device, and the terminal device may alternatively be replaced with a chip disposed in the terminal device.

Figure 2:
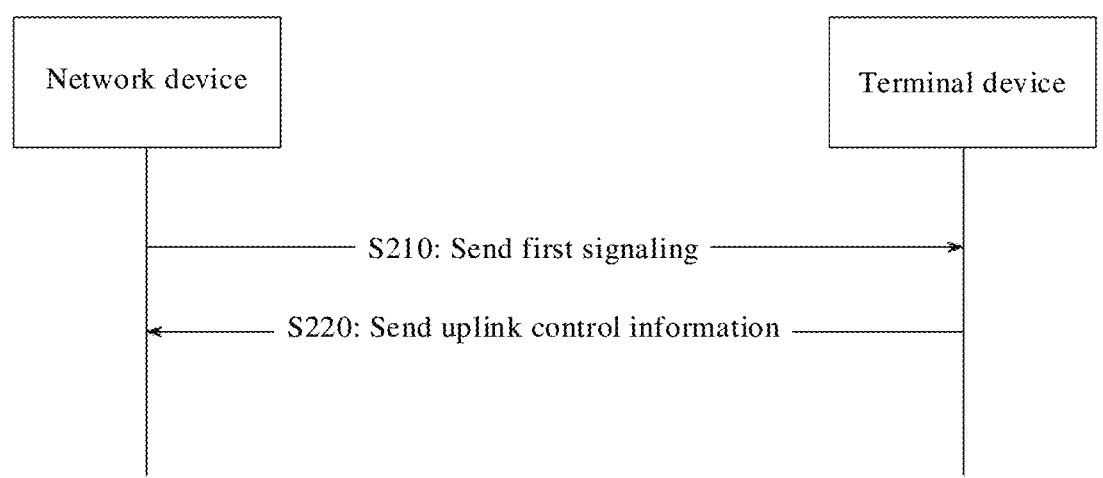
FIG. 2 is an example flowchart of a method according to an embodiment of this application.

FIG. 2 is a schematic flowchart of a method for transmitting uplink control information according to this application. The following describes steps shown in FIG. 2.

S210: A network device sends first signaling to a terminal device in a first cell, and correspondingly, the terminal device receives the first signaling.

The first signaling indicates a second cell in which the terminal device sends uplink control information. The uplink control information is uplink control information corresponding to the first cell, or the uplink control information is uplink control information corresponding to a third cell, or the uplink control information is uplink control information corresponding to the first cell and a third cell. The third cell is a cell other than the first cell and the second cell. It may be understood that, in different examples, there may be one or more second cells.

For example, the first signaling may be downlink control information (DCI). A design of the first signaling is described in more detail below.

For example, the network device may select the second cell based on communication quality of the cells, and further send the first signaling. Particularly, in an unlicensed spectrum, the network device may select the second cell based on idleness or busyness of the cells. The network device may assess, by using LBT, idle states of spectra corresponding to the cells, select the idle second cell, and send the first signaling, to indicate the terminal device to send the uplink control information in the second cell.

For example, the second cell is a PUCCH cell, that is, a cell configured by the network device for sending uplink control information, and may be, for example, a primary cell PCell, or may be a primary secondary cell PSCell, or may be a PUCCH SCell. It may be understood that the PUCCH cell is not an initially configured PUCCH cell for the first cell. Therefore, through such dynamic indication, a PUCCH cell can be selected for the terminal device based on a network state, thereby improving communication efficiency.

S220: The terminal device sends, uplink control information in the second cell to the network device, and correspondingly, the network device receives the uplink control information. It may be understood that, in this application, the uplink control information may be transmitted. The transmission herein includes sending and receiving from perspectives of different execution bodies.

The terminal device obtains uplink control information of a corresponding cell based on a measured downlink channel state of the cell and/or based on a downlink data receiving status and/or based on an uplink scheduling request, and sends the uplink control information to the network device. Based on indication of the first signaling, to-be-sent uplink control information of the cell may be sent in the second cell indicated by the first signaling.

Because it is known that the terminal device is indicated to send the uplink control information in the second cell, the network device receives the uplink control information in the second cell. Based on the received uplink control information, the network device may learn of a downlink data receiving status and/or a communication parameter, for example, an MCS and rank adaptation, configured for the terminal device in a corresponding cell.

In conclusion, according to the method provided in this application, when network quality changes, and quality of sending the uplink control information by the terminal device in a preconfigured cell is poor, or the uplink control information cannot be sent in the preconfigured cell, the network device may indicate, to the terminal device, a cell that is available for sending the uplink control information. In this way, the terminal device sends the uplink control information to the network device through the dynamically indicated cell, thereby ensuring efficient transmission of the uplink control information and improving communication efficiency. In a scenario of an unlicensed band, by using the method provided in this application, more sending opportunities can be provided for the terminal device, to ensure that the uplink control information can be sent in time, and improve communication efficiency.

In an embodiment, in a scenario of an unlicensed spectrum, before sending uplink control information in any cell, the terminal device needs to monitor a channel (LBT) to determine whether a corresponding carrier is idle. In a possible manner, the network device has performed channel monitoring before sending the downlink control information and/or the downlink data. Therefore, the network device has learned which cell is idle or carriers corresponding to which cells are idle. In this case, the network device may select, based on a monitoring result obtained by the network device, a second cell corresponding to an idle carrier, and indicate the terminal device to send the uplink control information in the second cell. In another possible manner, the network device considers by default that the terminal device sends the uplink control information at a specified location in the first cell or the third cell, but the terminal device fails to send the uplink control information due to an LBT failure. The network device fails to receive the expected uplink control information at the specified location. In this case, the network device may indicate the terminal device to send the uplink control information in the second cell.

In S220, the terminal device receives the first signaling, performs monitoring in the second cell, and sends the uplink control information when detecting that the terminal device is idle.

Optionally, the first signaling may indicate i second cells (second cell$_1$, . . . , and second cell$_i$ are used). For example, the first signaling includes identifiers of the i second cells. The i second cells may be used by the terminal device for sending uplink control information, and i is an integer greater than 1. Therefore, when LBT performed by the terminal device on the second cell$_1$ fails or a carrier is busy, the terminal device may monitor another cell of the i second cells, or optionally, the terminal device simultaneously monitors the i second cells, and finally selects one or more idle second cells for sending the uplink control information. More opportunities can increase a sending probability.

Cross-PUCCH group UCI transmission is performed through PUCCH resource configuration with reference to dynamic indication of DCI, thereby improving flexibility of PUCCH resource configuration, avoiding a conflict between a dynamically indicated resource for sending uplink control information and an initial PUCCH resource, and effectively improving a PUCCH transmission success rate.

The following describes a implementation of the first signaling by using an example with reference to different scenarios. It may be understood that a implementation of the first signaling described below is merely used as an example, and is not intended to limit the method in this application.

EXAMPLE 1

The first signaling includes a second cell identifier. In other words, the network device directly indicates, to the terminal device, an identifier of a cell for sending the uplink control information. The second cell identifier may be an identifier (ID), for example, a ServCellIndex, of a cell.

Therefore, the terminal receives downlink control information, identifies, from the downlink control information, the identifier of the second cell for sending uplink control information, and sends the uplink control information to the network device in the second cell, where the uplink control information corresponds to the first cell.

In a cross-carrier scheduling scenario, the downlink control information further includes a third cell identifier, and the third cell identifier indicates a cell corresponding to the uplink control information. The network device sends the downlink control information to the terminal device through the first cell. The downlink control information includes a third cell identifier. Therefore, the downlink control information may be sent on only one carrier, and the terminal device does not need to perform blind detection on each carrier. After receiving the downlink control information, the terminal device identifies, from the downlink control information, the identifier of the second cell for sending the uplink control information and an identifier of the third cell for corresponding to the uplink control information, and sends, in the second cell, the uplink control information corresponding to the third cell to the network device.

EXAMPLE 2

The first cell, the second cell, and the third cell may belong to a same cell group, or may belong to different cell groups, which is described in more detail below.

Referring to FIG. 3, an example in which the network device corresponds to a plurality of cells is used for further description. In the embodiment shown in FIG. 3, cells 1 to 8 are divided into two cell groups. A first cell group includes cells 1 to 4, and a second cell group includes cells 5 to 6.

In the embodiment shown in FIG. 3, the uplink control information of the first cell group is sent in the cell 1, that is, the cell 1 is a PUCCH cell, and the uplink control information of the second cell group is sent in the cell 5, that is, the cell 5 is a PUCCH cell. For example, uplink control information corresponding to the cell 2 is sent in the cell 1 instead of the cell 2, and uplink control information corresponding to the cell 6 is sent in the cell 5 instead of the cell 6.

Manner 1

The downlink control information includes a cell group identifier, and the cell group identifier is used for determining a cell for sending the uplink control information. For each cell group, a cell used by the cell group for sending uplink control information is specific, that is, a PUCCH cell is known. Therefore, the terminal may determine a PUCCH cell of a cell group according to a cell group identifier, and send uplink control information of a currently accessed cell through the PUCCH cell.

In an example, a field for indicating a cell group identifier is added to the downlink control information. Using the first cell group and the second cell group as examples, a PUCCH group ID field may be added to the downlink control information, and the field may occupy 1 bit. If the network device sets the PUCCH group ID field to 0, the first cell group is indicated, and if the PUCCH group ID field is set to 1, the second cell group is indicated. Alternatively, if the network device sets the PUCCH group ID field to 0, the second cell group is indicated, and if the PUCCH group ID field is set to 1, the first cell group is indicated. It may be understood that the "PUCCH group ID" field is merely used as an example for description, and another name may also be used, for example, a "PUCCH cell indicator" or a "PUCCH cell group index". Values of the field are not limited to 0 and 1. According to a configuration of a cell group, the field may be set to another value.

Using FIG. 3 as an example, the terminal device receives the downlink control information in the cell 2, and determines, based on a value of the PUCCH group ID field, a cell in which the uplink control information corresponding to the cell 2 is sent. If a value of the PUCCH group ID field is 1, it indicates that the terminal sends, in a PUCCH cell (that is, the cell 1) in the first cell group, uplink control information corresponding to the cell 2. Alternatively, if a value of the field PUCCH group ID is 0, it indicates that the terminal sends, in a PUCCH cell (that is, the cell 5) in the second cell group, uplink control information corresponding to the cell 2.

Manner 2

In another example, the first signaling includes a first indication, and the terminal device receives the first signaling in the first cell. The first indication indicates whether the terminal device sends the uplink control information in a cross-cell group manner. Specifically, the first indication indicates the terminal device to send, in the first cell group, the uplink control information corresponding to the first cell or the uplink control information corresponding to the third cell, or the first indication is used by the terminal device for sending, in a cell group other than the first cell group, the uplink control information corresponding to the first cell or the uplink control information corresponding to the third cell. The first signaling is downlink control information, and the first indication is a cross PUCCH group indication field added to the downlink control information, that is, whether the terminal device sends uplink control information in a cell group different from a current cell. The cross PUCCH group indication field may occupy 1 bit. If the network device sets the cross PUCCH group indication field to 1, it indicates that the terminal may send the uplink control information in a cross-group manner, and if the network device sets the cross PUCCH group indication field to 0, it indicates that the terminal sends the uplink control information in the current cell group. Alternatively, in some other embodiments, if the network device sets the cross PUCCH group indication field to 0, it indicates that the terminal may send the uplink control information in a cross-group manner, and if the network device sets the cross PUCCH group indication field to 1, it indicates that the terminal sends the uplink control information in the current cell group. It may be understood that the cross PUCCH group indication field is merely used as an example for description, and is not intended to limit the method in this application.

Figure 5:
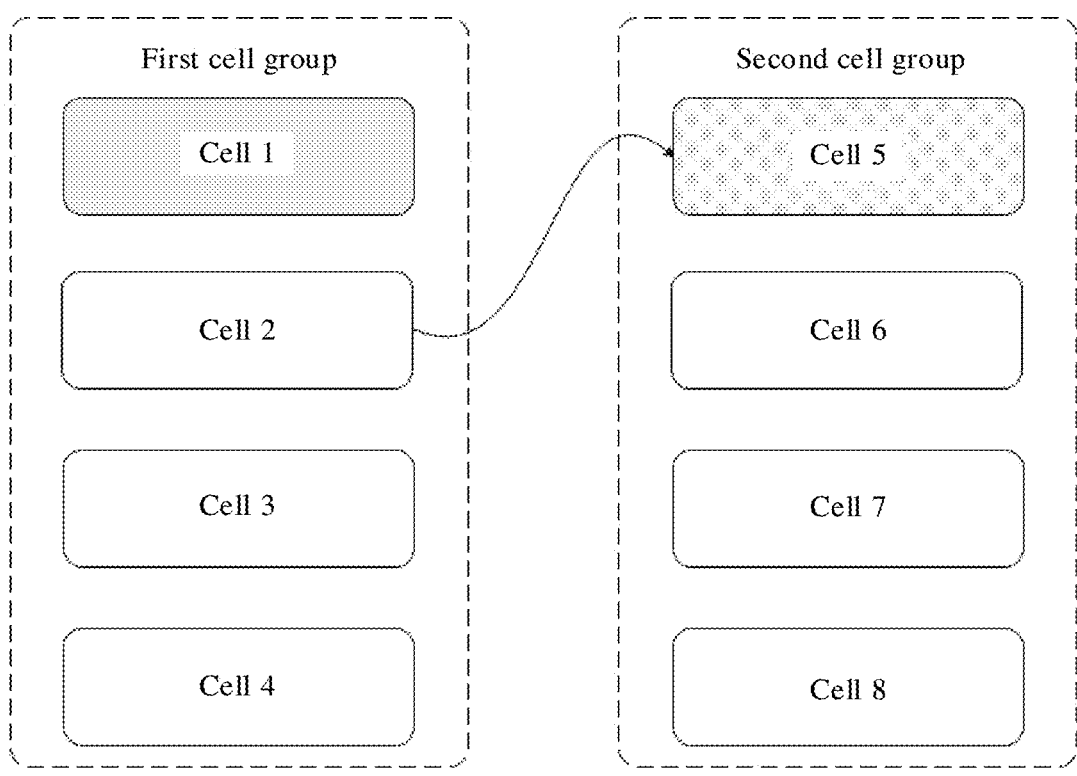
FIG. 5 is an example schematic diagram of sending uplink control information in a cross-group manner according to an embodiment of this application.

Descriptions are provided with reference to FIG. 3. A cell 2 currently accessed by the terminal device is used as an example. The network device sets a value of the cross PUCCH group indication field of the downlink control information, and sends the downlink control information to the terminal device in the cell 2. The terminal device receives the downlink control information in the cell 2, and determines, based on the value of the cross PUCCH group indication field, whether to send the uplink control information in a cross-group manner. A group to which the cell 2 belongs is the first cell group. If the value of the cross PUCCH group indication field is 1, the terminal device sends the uplink control information corresponding to the cell 2 in the PUCCH cell (that is, the cell 5) in the second cell group, that is, the uplink control information is sent in a cross-group manner (as shown in FIG. 5). If the value of the field cross PUCCH group indication field is 0, the terminal device sends the uplink control information corresponding to the cell 2 in the PUCCH cell (that is, the cell 1) in the first cell group, that is, the uplink control information is not sent in a cross-group manner.

Manner 3

The first signaling includes a cell identifier, indicating a cell in which the terminal device sends the uplink control information. Specifically, the first signaling is downlink control information, and the network device may add a PUCCH cell ID field to the downlink control information to indicate a cell in which the uplink control information is sent. Alternatively, an existing field in a standard, for example, a "UL/SUL indicator" in a DCI format, is reused, to a cell in which uplink control information is sent. It may be understood that in some scenarios, another field may also be reused to implement indication.

With reference to FIG. 5, it is assumed that an ID of the cell 1 is "1", and an ID of the cell 5 is "5". The network device sends downlink control information to the terminal device in the cell 2, and the terminal device receives the downlink control information in the cell 2 and determines, based on a value of the PUCCH cell ID field, a cell in which uplink control information corresponding to the cell 2 is sent. If the value of the PUCCH cell ID field is 1, the terminal device is indicated to send, in the cell 1, uplink control information corresponding to the cell 2. If the value of the PUCCH cell ID field is 5, the terminal device is indicated to send, in the cell 5, uplink control information corresponding to the cell 5.

With reference to manners 1 to 3, in a scenario in which the network device uses cross-carrier scheduling, the first signaling further includes a third cell identifier. To be specific, the network device sends downlink control information in a current cell, to indicate how to send uplink control information corresponding to another cell. A field may be used as the third cell identifier. With reference to FIG. 3, for example, the network device sends downlink control information in a cell 2, where the downlink control information carries an identifier of the cell 3. In this case, the terminal obtains the identifier of the cell 3 based on the downlink control information, and sends, in a cell determined in manners 1 to 3, uplink control information corresponding to the cell 3. For example, an existing carrier indicator field in the DCI may be reused as the identifier of the third cell. For example, if a value of the carrier indicator is 3, and the third cell is a cell 3, it indicates that the current downlink control information corresponds to the cell 3.

EXAMPLE 3

Figure 6:
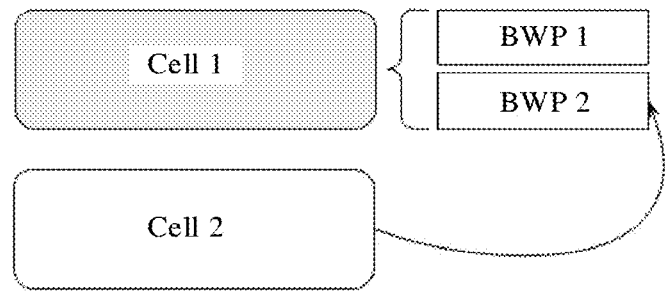
FIG. 6 is an example schematic diagram of sending uplink control information based on a BWP according to an embodiment of this application.

When there are a plurality of active BWPs in a cell, all the plurality of active BWPs can transmit the uplink control information. In this case, the first signaling further includes a BWP indicator, indicating a BWP transmitting the uplink control information in the cell. Referring to FIG. 6, there are two active BWPs, a BWP 1 and a BWP 2, on a carrier corresponding to the cell 1.

In an example, the first signaling is downlink control information, and the network device adds an uplink control channel bandwidth part indicator (PUCCH BWP indicator) field to the downlink control information, to indicate a BWP used by the terminal device for sending the uplink control information. The BWP belongs to a cell in which the uplink control information can be sent. In this case, when determining, according to the foregoing method, the cell for sending the uplink control information, the terminal device further determines, based on the PUCCH BWP indicator field, a BWP for transmitting the uplink control information in the cell.

The uplink control channel bandwidth part indicator is a BWP index. FIG. 6 is used as an example. Active BWPs in a cell 1 include a BWP 1 and a BWP 2, where an index of the BWP 1 is 1, and an index of the BWP 2 is 2. The network device indicates, in the cell 2 by using the downlink control information, the terminal device to transmit the uplink control information. The PUCCH cell ID field of the downlink control information is 1, and the PUCCH BWP indicator field of the downlink control information is 1, which means that the terminal can transmit the uplink control information on the BWP 1 of the cell 1. The terminal obtains values of the PUCCH cell ID field and the PUCCH BWP indicator field from the downlink control information, and transmits, on the BWP 1 of the cell 1, the uplink control information corresponding to the cell 2.

It may be understood that indication of a cell in Example 3 may alternatively be performed in any one or more manners in Example 2.

Figure 7:
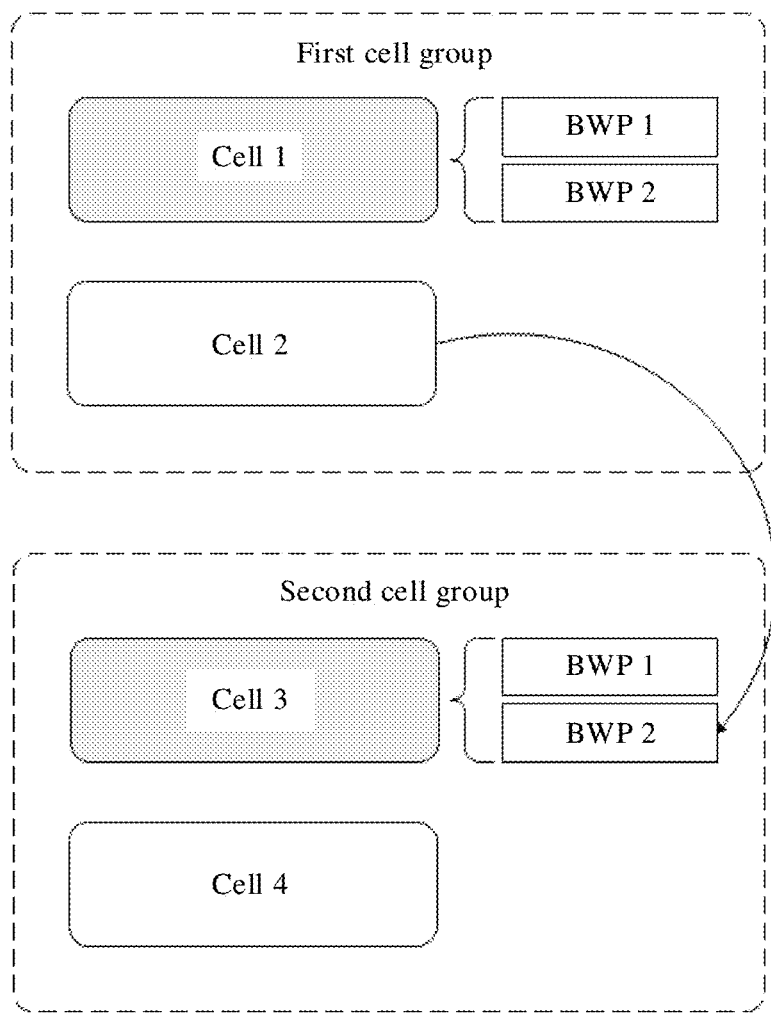
FIG. 7 is an example schematic diagram of sending uplink control information in a cross-group manner based on a BWP according to an embodiment of this application.

FIG. 7 is used as an example. The network device supports a first cell group and a second cell group. The first cell group includes cells 1 and 2, a PUCCH cell is the cell 1, the second cell group includes cells 3 and 4, and a PUCCH cell is the cell 3. The network device indicates, in the cell 2 by using a cross PUCCH group indication field and a PUCCH BWP indicator field in the downlink control information, where the terminal sends the uplink control information. A value of the cross PUCCH group indication field is 1, and a value of the "PUCCH BWP indicator" field is 2, which means that the terminal device needs to transmit uplink control information in a cross-group manner, that is, transmit uplink control information on a BWP 2 in a PUCCH cell (that is, the cell 3) in another cell group. The terminal device obtains, from the received downlink control information, the values of the cross PUCCH group indication field and the PUCCH BWP indicator field, and transmits the uplink control information corresponding to the cell 2 on the BWP 2 of the cell 3.

A combination of indication of the BWP information and indication of the cell can implement dynamic indication of a resource for transmitting the uplink control information, thereby improving flexibility of transmitting the uplink control information. Particularly, in a scenario of an unlicensed band, a plurality of opportunities for transmitting uplink control information may be provided, thereby improving system performance.

EXAMPLE 4

For a scenario in which a communication system supports two or more PUCCH cells, Embodiment 4 of this application provides a pairing-based cross-PUCCH group uplink control information transmission solution. The network device may pair different PUCCH cells in a pairing manner in a system message or RRC signaling, and cross-group uplink control information transmission may be performed in a paired (e.g., grouped) PUCCH group. Cross-PUCCH group uplink control information transmission may be implemented based on pairing information with reference to the dynamic indication.

The network device corresponds to M cell groups, the M cell groups include N cell pairs, and one cell pair includes at least two cell groups in the M cell groups. M is an integer greater than 2, and N is an integer greater than 1. The first cell is in the first cell group. The first signaling includes a second indication, the second indication indicates the terminal device to transmit the uplink control information in the first cell group, and the second cell is a cell configured in the first cell group for sending the uplink control information. Alternatively, the second indication indicates the terminal device to send the uplink control information in another cell group in a cell pair to which the first cell group belongs, and the second cell is a default cell configured in the another cell group for transmitting the uplink control information. The second indication is similar to manner 2 in Example 2, that is, indicates cross-group transmission.

Figure 8:
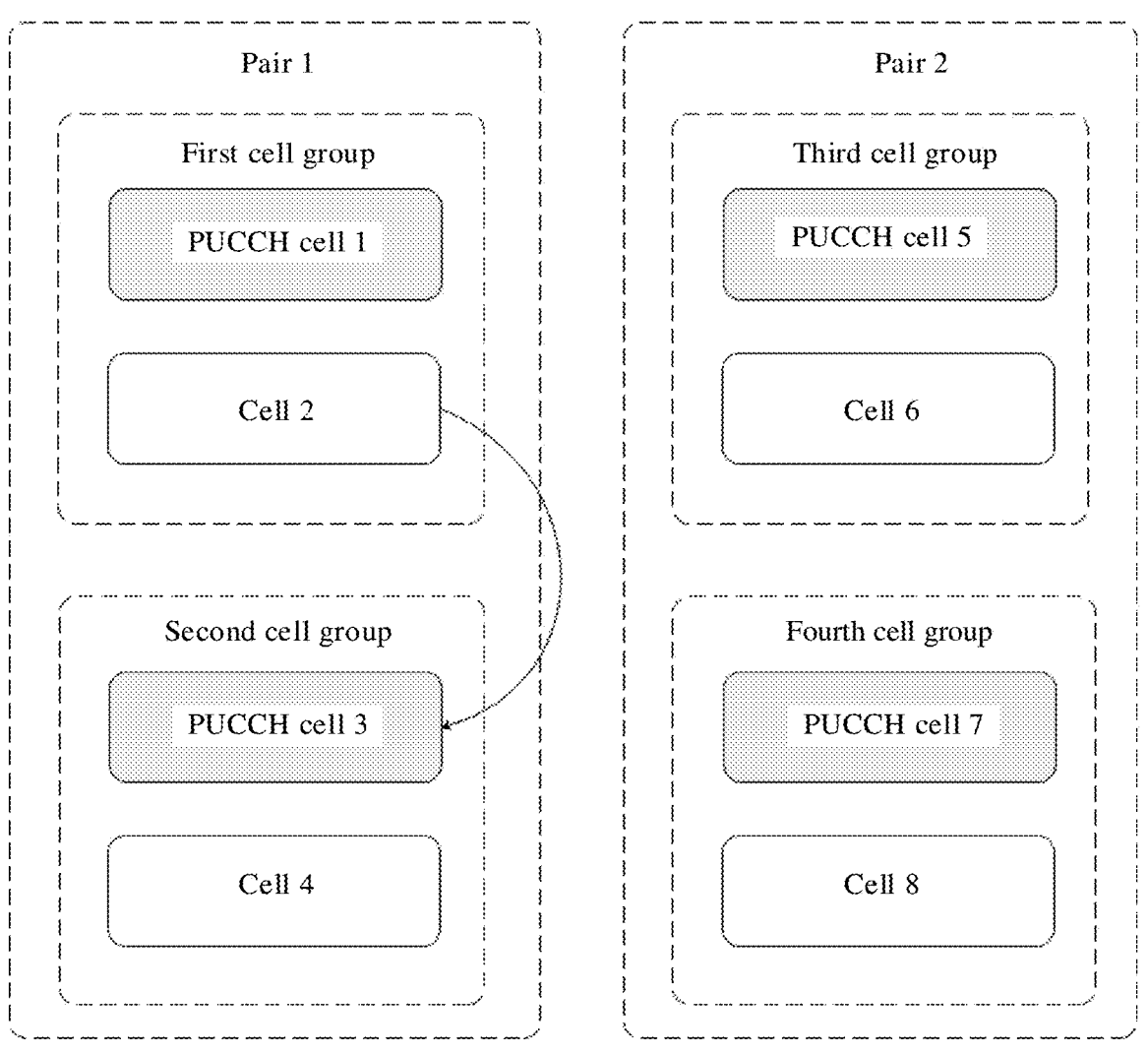
FIG. 8 is an example schematic diagram of cell group pairing according to an embodiment of this application.

As shown in FIG. 8, M=4, and N=2. To be specific, the network device configures four PUCCH cells: a cell 1, a cell 3, a cell 5, and a cell 7. The cells 1 and 2 belong to a first cell group, the cells 3 and 4 belong to a second cell group, the cells 5 and 6 belong to a third cell group, and the cells 7 and 8 belong to a fourth cell group. Each cell group includes one PUCCH cell. The network device pairs two PUCCH cells, or may be understood as configuring two PUCCH cells to form a group. Because one PUCCH cell corresponds to one cell group, it may also be understood as that the network device pairs two cell groups. In another example, the network device may also pair two cell groups.

After PUCCH cell pairing, the network device may indicate that the uplink control information may be sent in a cross-group manner. For example, the network device pairs a PUCCH cell 1 with a PUCCH cell 3, and cross-group uplink control information transmission may be performed between a first cell group to which the cell 1 belongs and a second cell group to which the cell 3 is belongs. In other words, uplink control information corresponding to a cell in the first cell group may be sent by using a PUCCH cell (that is, the cell 3) in the second cell group. The cell 2 is used as an example. The network device sends, in the cell 2, downlink control information including a cross-group indication to the terminal device. If the cross-group indication indicates that uplink control information is sent in a cross-group manner (for example, cross PUCCH group indication=1), the terminal device receives the downlink control information, and sends, in a PUCCH cell (that is, the cell 3) of a paired cell group (that is, the second cell group), uplink control information corresponding to the cell 2; or if the cross-group indication indicates that uplink control information is not sent in a cross-group manner (for example, cross PUCCH group indication=0), the terminal device receives the downlink control information, and sends, in a PUCCH cell (namely, the cell 1) in a current cell group (namely, the first cell group), uplink control information corresponding to the cell 2.

Table 1 is a schematic table of PUCCH cell pairing. The table may be specified in a protocol. In this case, the network device and the terminal can learn, by exchanging only a cross-group indication, a cell in which the uplink control information can be sent.

TABLE 1

| Pair index (Pair index) | PUCCH group pairing (PUCCH group pair) |
|---|---|
| 1 | {PUCCH cell 1, PUCCH cell 3} |
| 2 | {PUCCH cell 5, PUCCH cell 7} |

With reference to FIG. 8, the PUCCH cell 1 is paired with the PUCCH cell 3, that is, the first cell group is paired with the second cell group; and the PUCCH cell 5 is paired with the PUCCH cell 7, that is, the third cell group is paired with the fourth cell group. Each pair of PUCCH cells (or cell groups) has a pair index. It may be understood that 1 or 2 is merely an example of the pair index. In another embodiment, another numbering rule may be used for the pair index, which is not limited to the method in this application.

It may be understood that a manner of pairing two PUCCH cells may also be further extended to clustering a plurality of PUCCH cells. If the PUCCH cells form a cluster, corresponding cell groups also form a cluster. Cross-group uplink control information transmission may be performed between clustered cell groups. For example, it is assumed that the network device configures five PUCCH cells: a cell 1, a cell 3, a cell 5, a cell 7, and a cell 9. The cells 1 and 2 belong to a first cell group, the cells 3 and 4 belong to a second cell group, the cells 5 and 6 belong to a third cell group, the cells 7 and 8 belong to a fourth cell group, and the cells 9 and 10 belong to a fifth cell group. Each cell group includes one PUCCH cell. Quantities of cell groups included in clusters may be the same or different.

The PUCCH cells 1, 3, and 5 form a cluster, that is, the first cell, the second cell, and the third cell form a cluster. The PUCCH cell 7 and the PUCCH cell 9 form a cluster, that is, the fourth cell group and the fifth cell group form a cluster.

In this case, if the network device needs to indicate that the uplink control information is sent in a cross-group manner, only a PUCCH cell in the cluster needs to be indicated. That is, the first signaling may include identification information of a cell group in a cluster. For example, as shown in Table 2, because there are a maximum of three cell groups in a cluster, 00 may represent the first cell group in the cluster, 01 represents the second cell group in the cluster, and 10 represents the third cell group in the cluster, only two bits are required to indicate a cell for uplink control information, thereby reducing signaling overheads.

TABLE 2

| Cluster index (Pair index) | PUCCH cluster (PUCCH group cluster) |
|---|---|
| 1 | {PUCCH cell 1, PUCCH cell 3, PUCCH cell 5} |
| 2 | {PUCCH cell 7, PUCCH cell 9} |

Figure 9:
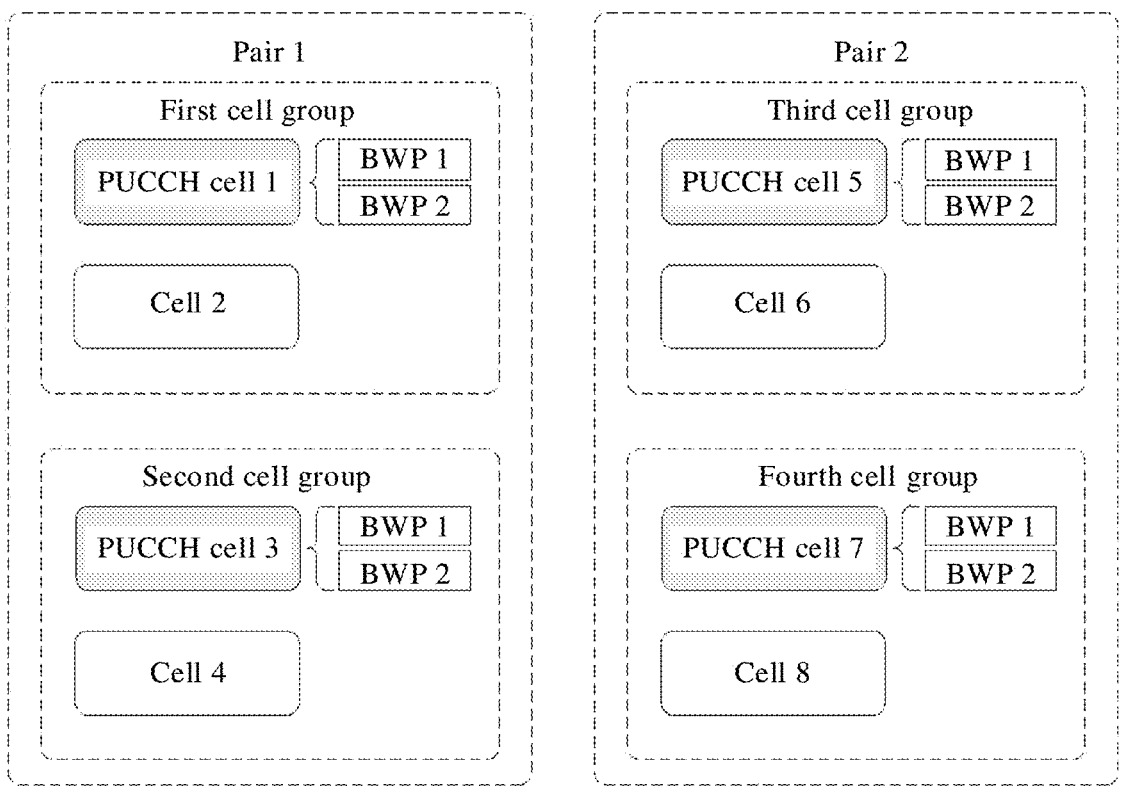
FIG. 9 is an example schematic diagram of a BWP in cell group pairing according to an embodiment of this application.

In an example, the PUCCH cell may support a plurality of active BWPs. The network device may further include the downlink control information in a BWP indicator, for example, a PUCCH BWP indicator, to indicate, to the terminal, a BWP that is in the PUCCH cell and that is for sending uplink control information. The network device may refer to a PUCCH cell indication method provided in another example. Referring to FIG. 9, an example in which the network device sends downlink control information to the terminal device in a cell 2 is used. If a value of a cross PUCCH group indication field is 0, and a value of a PUCCH BWP indicator field is 1, it indicates that the uplink control information is not transmitted in a cross-group manner and is transmitted on a BWP 1 of an indicated PUCCH cell. The terminal device receives the downlink control information, and sends uplink control information corresponding to the cell 2 on a BWP 1 of a PUCCH cell (namely, the cell 1) in a cell group to which the cell 2 belongs. If the value of the cross PUCCH group indication field is 1, and the value of the PUCCH BWP indicator field is 1, it indicates that the uplink control information is transmitted in a cross-group manner and is transmitted on a BWP 1 of a PUCCH cell. The terminal receives the downlink control information, and sends the uplink control information corresponding to the cell 2 on a BWP 1 of a PUCCH cell (namely, the cell 3) in a cell group paired with the cell group to which the cell 2 belongs.

Based on the foregoing examples, this application provides a plurality of flexible indications of a PUCCH cell used by the terminal device for sending uplink control information. When a network state changes, the network device may dynamically indicate the PUCCH cell for the terminal device by using the foregoing plurality of example methods, thereby improving communication efficiency.

Figure 10:
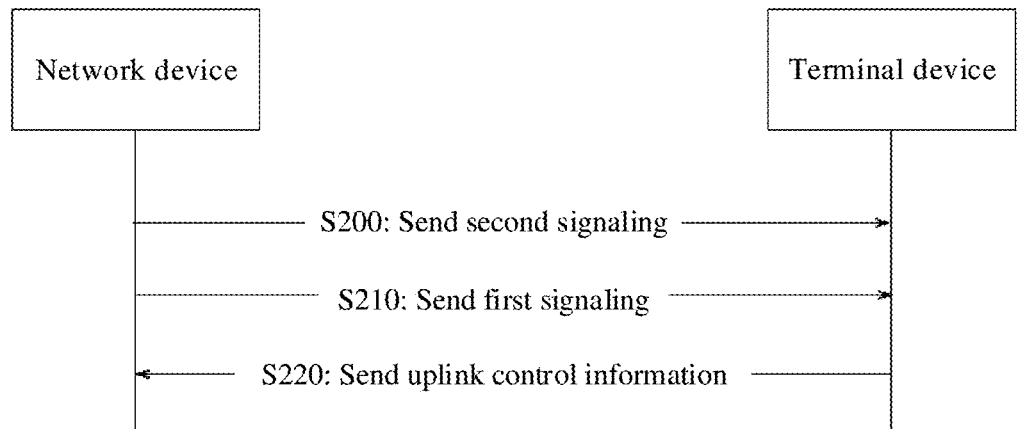
FIG. 10 is an example flowchart of another method according to an embodiment of this application.

Referring to FIG. 10, in another embodiment, before S210, the method for transmitting uplink control information further includes the following steps.

S200: The network device sends second signaling, where the second signaling is used for configuring a first time-frequency resource of at least one second cell. The first time-frequency resource includes a time domain resource and a frequency domain resource, and the first time-frequency resource may be referred to as a "first PUCCH resource". The first PUCCH resource is a time-frequency domain resource different from the initial PUCCH resource, and is for sending uplink control information. If the second cell includes a plurality of active BWPs, the first PUCCH resource further includes a BWP for sending uplink control information.

For example, the second signaling is RRC signaling, and the first PUCCH resource may be configured by using a field in an information element (IE) in the RRC signaling. For example, the first PUCCH resource may be configured by using a pucch-Config field in BWP-UplinkDedicated, or the first PUCCH resource may be configured by using a pucch-ConfigCommon field in BWP-UplinkCommon. In an example in which cross-group sending of the uplink control information is supported, the first PUCCH resource is a PUCCH resource for sending uplink control information in a cross-group manner, that is, a PUCCH resource of a cell in a cell group different from the initial PUCCH cell.

For example, the second signaling is DCI. The first PUCCH resource may be directly indicated by using DCI. For example, a time-frequency domain resource of the first PUCCH resource may be indicated by reusing a time domain resource assignment field and/or a frequency domain resource assignment in the DCI, or a PUCCH time domain resource field or a PUCCH time domain resource assignment (PUCCH frequency domain resource assignment) field are added to the DCI, to indicate the first PUCCH resource.

For example, the second signaling is DCI and RRC signaling. To be specific, a group of first PUCCH resources are configured by using the RRC signaling, each first PUCCH resource has one PUCCH resource identifier (for example, a PUCCH resource ID), and then one or more PUCCH resource identifiers are specifically indicated by using the DCI. The terminal device may determine, based on the one or more PUCCH identifiers, a corresponding PUCCH resource for sending uplink control information. Optionally, each first PUCCH resource has a PUCCH resource index (PUCCH resource index), and the network device may also indicate one or more PUCCH resource indexes by using DCI, to indicate a PUCCH resource used by the terminal device for sending uplink control information. Therefore, the terminal device can learn of a specific first PUCCH resource based on the resource configured by using the RRC signaling with reference to indication of the DCI.

For example, information about a first PUCCH resource that is on at least one BWP of at least one second cell and that is configured by using the second signaling is associated with the first cell and/or the third cell. Optionally, that the information about the first PUCCH resource is associated with the first cell indicates that the first PUCCH resource is a PUCCH resource that is configured for the first cell and that is for sending uplink control information in a cross-group manner. Specifically, the initial PUCCH resource of the first cell belongs to a PUCCH cell in a cell group to which the first cell belongs, and the first PUCCH resource belongs to a PUCCH cell in a cell group different from the cell group to which the first cell belongs. This is similar for the third cell.

The association is described by using an example in which the first PUCCH resource information is associated with the first cell. There are the following several possibilities, which is not limited in the method of this application. Manner 1: Configuration information of the first PUCCH resource belonging to the second cell is added to cell configuration information corresponding to the first cell. Manner 2: Configuration information of the first PUCCH resource and information about the first cell are added to cell configuration information corresponding to the second cell.

Referring to FIG. 2, another embodiment of this application further provides a method. The method includes step S210.

S210: A network device sends first signaling to a terminal device in a first cell, and correspondingly, the terminal device receives the first signaling. The first signaling indicates the terminal device to send uplink control information corresponding to a second cell, and the first cell and the second cell belong to different cell groups.

S220: The terminal device sends, in the first cell, uplink control information corresponding to a second cell to the network device.

Optionally, the first signaling includes an identifier of the second cell. For a implementation of a cell and a cell group and a implementation of sending control information based on a cell and/or a cell group, refer to the foregoing embodiments. The terminal device is indicated, in a current cell in which the downlink control information is sent, to send uplink control information corresponding to a cell in another cell group, so that the network device can learn of uplink control information of a needed cell in time and perform corresponding network planning, thereby optimizing communication performance.

The method provided in embodiments of this application is described above in detail with reference to FIG. 2 to FIG. 10. In correspondence to the methods provided in the foregoing method embodiments, an embodiment of this application further provides a corresponding apparatus. The apparatus includes corresponding modules configured to perform the foregoing embodiments. The module may be software, hardware, or a combination of software and hardware.

Figures 11, 12:
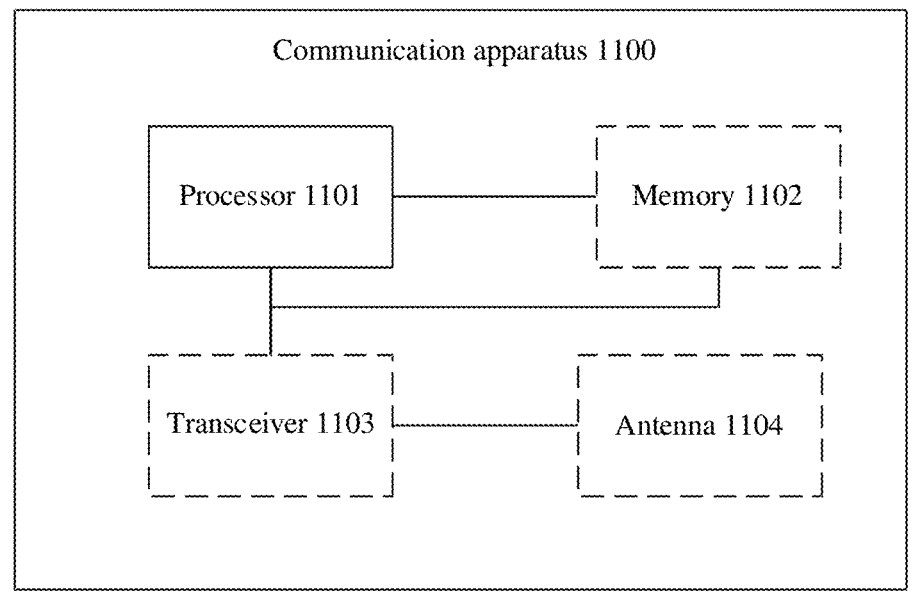
FIG. 11 is an example simplified schematic diagram of a structure of a communication apparatus according to an embodiment of this application.
FIG. 12 is an example simplified schematic diagram of a structure of a terminal device according to an embodiment of this application.

FIG. 11 is a schematic diagram of a structure of an apparatus 1100 (e.g., communication apparatus). The apparatus 1100 may be a network device, a terminal device, a server, or a centralized controller, or may be a chip, a chip system, a processor, or the like that supports the network device, the terminal device, the server, or the centralized controller in implementing the foregoing method. The apparatus may be configured to implement the methods described in the foregoing method embodiments. For details, refer to the descriptions in the foregoing method embodiments.

The apparatus 1100 may include one or more processors 1101. The processors 1101 may also be referred to as a processing unit and can implement some control functions. The processor 1101 may be a general-purpose processor, a dedicated processor, or the like. For example, the processor 1101 may be a baseband processor or a central processing unit. The baseband processor may be configured to process a communication protocol and communication data. The central processing unit may be configured to control the communication apparatus (for example, a base station, a baseband chip, a terminal, a terminal chip, a DU, or a CU), execute a software program, and process data of the software program.

In an optional implementation, the processor 1101 may also store instructions and/or data. The instructions and/or data may be run on the processor, to enable the apparatus 1100 to perform the method described in the foregoing method embodiments.

In another optional implementation, the processor 1101 may include a transceiver unit configured to implement receiving and sending functions. For example, the transceiver unit may be a transceiver circuit, an interface, an interface circuit, or a communication interface. The transceiver circuit, the interface, or the interface circuit configured to implement the receiving and sending functions may be separated, or may be integrated together. The transceiver circuit, the interface, or the interface circuit may be configured to read and write code or data. Alternatively, the transceiver circuit, the interface, or the interface circuit may be configured to transmit or transfer a signal.

In still another possible implementation, the apparatus 1100 may include a circuit. The circuit may implement the sending, receiving, or communication function in the foregoing method embodiments.

Optionally, the apparatus 1100 may include one or more memories 1102. The one or more memories may store instructions. The instructions may be run on the processor, to enable the apparatus 1100 to perform the method described in the foregoing method embodiments. Optionally, the memory may further store data. Optionally, the processor may also store instructions and/or data. The processor and the memory may be disposed separately, or may be integrated together. For example, the correspondence described in the foregoing method embodiments may be stored in the memory or stored in the processor.

Optionally, the apparatus 1100 may further include a transceiver 1103 and/or an antenna 1104. The processor 1101 may also be referred to as a processing unit, controlling the apparatus 1100. The transceiver 1005 may be referred to as a transceiver unit, a transceiver, a transceiver circuit, a transceiver apparatus, a transceiver module, or the like, and is configured to implement sending and receiving functions.

Optionally, the apparatus 1100 in embodiments of this application can be configured to perform the methods described in FIG. 2 and FIG. 10 in embodiments of this application.

The processor and the transceiver described in this application may be implemented in an integrated circuit (IC), an analog IC, a radio frequency integrated circuit RFIC, a mixed signal IC, an application-specific integrated circuit (ASIC), a printed circuit board (PCB), an electronic device, or the like. The processor and the transceiver may also be manufactured by using various IC technologies, for example, a complementary metal oxide semiconductor (CMOS), an N-type metal oxide semiconductor (NMOS), a P-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

The apparatus described in the foregoing embodiments may be a network device or a terminal device. However, a range of the apparatus described in this application is not limited thereto, and a structure of the apparatus may not be limited to FIG. 11. The apparatus may be an independent device, or may be a part of a larger device. For example, the apparatus may be:

(1) an independent integrated circuit IC, a chip, or a chip system or subsystem;

(2) a set of one or more ICs, where optionally, the IC set may also include a storage component configured to store data and/or instructions;

(3) an ASIC, for example, a modem (e.g., mobile station modem (MSM));

(4) a module that can be embedded in another device;

(5) a receiver, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like; or (6) another device or the like.

FIG. 12 provides a schematic diagram of a structure of a terminal device. The terminal device may be used in the foregoing method embodiments. For ease of description, FIG. 12 shows only main components of the terminal device. As shown in FIG. 12, the terminal device 1200 includes a processor, a memory, a control circuit, an antenna, and an input/output apparatus. The processor is mainly configured to process a communication protocol and communication data, control the entire terminal, execute a software program, and process data of the software program. The memory is mainly configured to store a software program and data. The radio frequency circuit is mainly configured to perform conversion between a baseband signal and a radio frequency signal and process the radio frequency signal. The antenna is mainly configured to send and receive radio frequency signals in a form of an electromagnetic wave. The input/output apparatus, for example, a touchscreen, a display, or a keyboard, is mainly configured to receive data entered by a user and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in an electromagnetic wave form by using the antenna. When data is sent to the terminal device, the radio frequency circuit receives a radio frequency signal through the antenna, further converts the radio frequency signal into a baseband signal, and outputs the baseband signal to the processor. The processor converts the baseband signal into data, and processes the data.

For ease of description, FIG. 12 shows only one memory and one processor. In an actual terminal device, there may be a plurality of processors and a plurality of memories. The memory may also be referred to as a storage medium, a storage device, or the like. This is not limited in embodiments of this application.

In an optional implementation, the processor may include a baseband processor and a central processing unit. The baseband processor is mainly configured to process a communication protocol and communication data. The central processing unit is mainly configured to control the entire terminal device, execute software program, and process data of the software program. Functions of the baseband processor and the central processing unit are integrated into the processor in FIG. 12. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be embedded in the processor, or may be stored in a storage unit in a form of the software program. The processor executes the software program to implement a baseband processing function.

In an example, an antenna and a control circuit that have a transceiver function may be considered as a transceiver unit 1211 of the terminal device 1200, and a processor that has a processing function may be considered as a processing unit 1212 of the terminal device 1200. As shown in FIG. 12, the terminal device 1200 includes the transceiver unit 1211 and the processing unit 1212. The transceiver unit may also be referred to as a transceiver, a transceiver machine, a transceiver apparatus, or the like. Optionally, a component that is in the transceiver unit 1211 and that is configured to implement a receiving function may be considered as a receiving unit, and a component that is in the transceiver unit 1211 and that is configured to implement a sending function may be considered as a sending unit. In other words, the transceiver unit 1211 includes the receiving unit and the sending unit. For example, the receiving unit may also be referred to as a receiver, a receiver machine, a receiver circuit, or the like, and the sending unit may be referred to as a transmitter, a transmitter machine, a transmitter circuit, or the like. Optionally, the receiving unit and the sending unit may be one integrated unit, or may be a plurality of independent units. The receiving unit and the sending unit may be in one geographical position, or may be distributed in a plurality of geographical positions.

Figure 13:
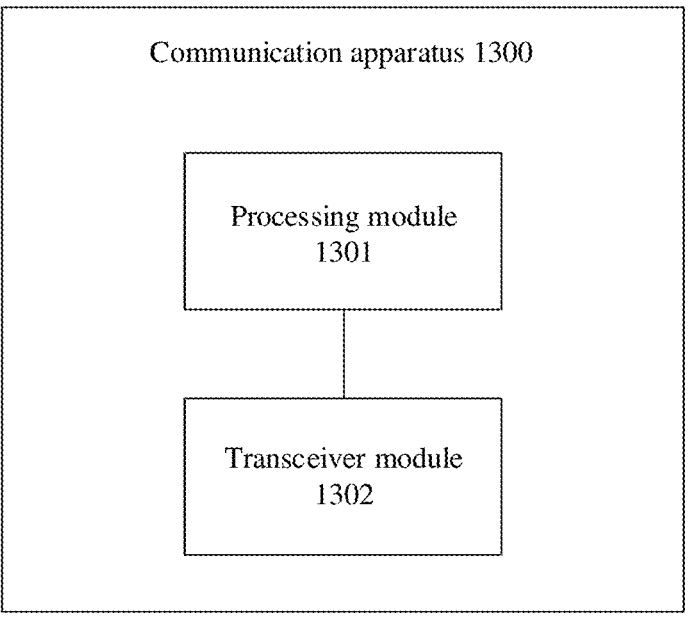
FIG. 13 is an example schematic diagram of modules of a communication apparatus according to an embodiment of this application.

As shown in FIG. 13, still another embodiment of this application provides a communication apparatus 1300. The apparatus may be a network device, or may be a component (for example, an integrated circuit or a chip) of the network device. Alternatively, the apparatus may be another communication module configured to implement the methods in the method embodiments of this application. The communication apparatus 1300 may include a processing module 1301 (or referred to as a processing unit) and a transceiver module 1302.

In a possible implementation, the processing module 1301 is configured to control the transceiver module 1302 to send first signaling in a first cell to a terminal device. The first signaling indicates a second cell in which the terminal device sends uplink control information, the uplink control information is uplink control information corresponding to the first cell or uplink control information corresponding to a third cell, and the third cell is a cell other than the first cell and the second cell.

The processing module 1301 is configured to control the transceiver module 1302 to receive the uplink control information from the terminal device in the second cell.

In a scenario of an unlicensed band, the uplink control information of the terminal device is sent by the terminal device after the terminal device detects that the second cell is idle.

Optionally, the processing module 1301 is configured to control the transceiver module 1302 to send second signaling to the terminal device. The second signaling indicates a first time-frequency resource configured in the second cell for transmitting the uplink control information, and the first time-frequency resource is different from an initial time-frequency resource configured in the second cell for transmitting the uplink control information.

For implementations of the first signaling and the second signaling, refer to the method embodiments.

In a possible implementation, the processing module 1301 is configured to control the transceiver module 1302 to send first signaling. The first signaling indicates the terminal device to send uplink control information corresponding to a second cell, and the first cell and the second cell belong to different cell groups.

The processing module 1301 is configured to control the transceiver module 1302 to receive the uplink control information in the first cell.

Optionally, the first signaling includes an identifier of the second cell.

In a possible implementation, one or more modules in FIG. 13 may be implemented by one or more processors, or may be implemented by one or more processors and memories, or may be implemented by one or more processors and transceivers, or may be implemented by one or more processors, memories, and transceivers. This is not limited in this embodiment of this application. The processor, the memory, and the transceiver may be disposed separately, or may be integrated together.

The communication apparatus 1300 has a function of implementing the network device described in embodiments of this application. For example, the communication apparatus includes a corresponding module or unit or means of the network device performing a step related to the network device described in embodiments of this application. The function, unit, or means may be implemented by software, or by hardware, or by hardware executing corresponding software, or may be implemented by a combination of software and hardware. For details, refer to the corresponding descriptions in the foregoing corresponding method embodiment.

Figure 14:
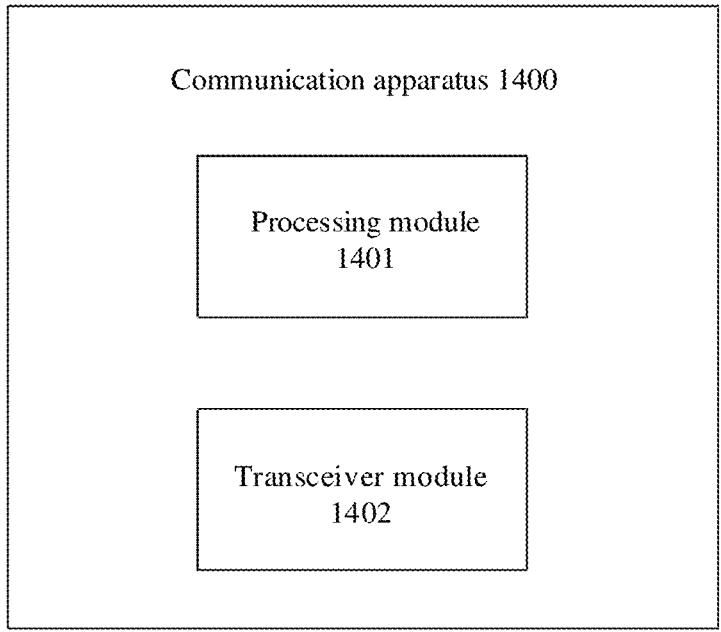
FIG. 14 is an example schematic diagram of modules of another communication apparatus according to an embodiment of this application.

As shown in FIG. 14, still another embodiment of this application provides a communication apparatus 1400. The apparatus may be a terminal device, or may be a component (for example, an integrated circuit or a chip) of the terminal device. Alternatively, the communication apparatus may be another communication module, configured to implement the method in method embodiments of this application. The communication apparatus 1400 may include a processing module 1401 (or referred to as a processing unit) and a transceiver module 1402.

The processing module 1401 is configured to control the transceiver module 1402 to receive first signaling in a first cell from a network device. The first signaling indicates a second cell in which the terminal device sends uplink control information, the uplink control information is uplink control information corresponding to the first cell or uplink control information corresponding to a third cell, and the third cell is a cell other than the first cell and the second cell.

The processing module 1401 is further configured to control the transceiver module 1402 to send the first signaling in the second cell to the network device.

In an unlicensed scenario, the processing module 1401 performs LBT based on a signal input by the transceiver module 1402, and controls, when detecting idleness, the transceiver module 1402 to send signaling.

Optionally, the processing module 1401 is configured to control the transceiver module 1402 to receive second signaling from the network device. The second signaling indicates a first time-frequency resource configured in the second cell for transmitting the uplink control information, and the first time-frequency resource is different from an initial time-frequency resource configured in the second cell for transmitting the uplink control information.

For implementations of the first signaling and the second signaling, refer to the method embodiments.

In a possible implementation, the processing module 1401 is configured to control the transceiver module 1402 to receive first signaling in a first cell. The first signaling indicates the communication apparatus 1400 to send uplink control information corresponding to a second cell, and the first cell and the second cell belong to different cell groups.

The processing module 1401 is configured to control the transceiver module to send the uplink control information.

Optionally, the first signaling includes an identifier of the second cell.

In a possible implementation, one or more modules in FIG. 14 may be implemented by one or more processors, or may be implemented by one or more processors and memories, or may be implemented by one or more processors and transceivers, or may be implemented by one or more processors, memories, and transceivers. This is not limited in this embodiment of this application. The processor, the memory, and the transceiver may be disposed separately, or may be integrated together.

The communication apparatus 1400 has a function of implementing the network device described in embodiments of this application. For example, the apparatus includes a corresponding module or unit or means of the network device performing a step related to the network device described in embodiments of this application. The function, unit, or means may be implemented by software, or by hardware, or by hardware executing corresponding software, or may be implemented by a combination of software and hardware. For details, refer to the corresponding descriptions in the foregoing corresponding method embodiment.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions.

A person skilled in the art may further understand that various illustrative logical blocks and steps that are listed in embodiments of this application may be implemented by using electronic hardware, computer software, or a combination thereof. Whether the functions are implemented by using hardware or software depends on particular applications and a design requirement of an entire system. A person skilled in the art may use various methods to implement the functions for corresponding application, but it should not be considered that the implementation goes beyond the scope of embodiments of this application.

It may be understood that, the processor in embodiments of this application may be an integrated circuit chip, and has a signal processing capability. In an implementation process, steps in the foregoing method embodiments are implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

The solutions described in this application may be implemented in various manners. For example, the technologies may be implemented by hardware, software, or a combination thereof. For hardware implementation, a processing unit configured to perform these technologies at a communication apparatus (for example, a base station, a terminal, a network entity, or a chip) may be implemented in one or more general-purpose processors, a DSP, a digital signal processor, an ASIC, a programmable logic device, an FPGA or another programmable logic apparatus, a discrete gate or transistor logic device, a discrete hardware component, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that the memory in embodiments of this application may be a volatile memory or a non-volatile memory, or may include a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example and not limitation, RAMs in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the systems and methods described in this specification includes but is not limited to these and any memory of another appropriate type.

This application further provides a computer-readable medium storing a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It may be understood that "an embodiment" mentioned in the entire specification means that particular features, structures, or characteristics related to the embodiment are included in at least one embodiment of this application. Therefore, embodiments in the entire specification are not necessarily same embodiments. In addition, these particular features, structures, or characteristics may be combined in one or more embodiments in any appropriate manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It should be understood that, in this application, "when" and "if" mean that an apparatus performs corresponding processing in an objective situation, and are not intended to limit time. The terms do not mean that the apparatus is required to have a determining action during implementation, and do not mean any other limitation.

"Simultaneously" in this application may be understood as being at a same time point, may be understood as being within a time period, or may be understood as being within a same periodicity.

A person skilled in the art may understand that various numbers such as "first" and "second" in this application are merely used for differentiation for ease of description, and are not used to limit the scope of embodiments of this application. A specific value of a number (which may also be referred to as an index), a specific value of a quantity, and a position in this application are merely used as examples, but are not unique representation forms, and are not used to limit the scope of embodiments of this application. Various numbers such as "first" and "second" in this application are merely used for differentiation for ease of description, and are not used to limit the scope of embodiments of this application.

In this application, an element represented in a singular form is intended to represent "one or more", but does not represent "one and only one", unless otherwise specified. In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship between associated objects and represents that at least three relationships may exist. For example, A and/or B may represent the following three cases: only A exists, both A and B exist, and only B exists. A may be singular or plural, and B may be singular or plural. The character "/" usually indicates an "or" relationship between associated objects.

The term "at least one of" in this specification indicates all combinations or any combination of listed items. For example, "at least one of A, B, and C" may indicate the following six cases: only A exists, only B exists, only C exists, A and B coexist, B and C coexist, and A, B, and C coexist. A may be singular or plural, B may be singular or plural, and C may be singular or plural.

It should be understood that in embodiments of this application, "B corresponding to A" represents that B is associated with A, and B may be determined based on A. However, it should be understood that determining B based on A does not mean that B is determined based on only A. B may alternatively be determined based on A and/or other information.

The correspondences shown in the tables in this application may be configured, or may be predefined. Values of the information in the tables are only examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may understand that units and algorithm steps in the examples described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that, for the purpose of convenient and brief description, for a detailed working process of the foregoing system, apparatus, and unit, refer to a corresponding process in the foregoing method embodiments.

It may be understood that the system, apparatus, and method described in this application may alternatively be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in embodiments, unless otherwise specified or a logical conflict occurs, terms and/or descriptions are consistent and may be mutually referenced between different embodiments and between the implementations/implementation methods in embodiments. Technical features in the different embodiments and the implementations/implementation methods in embodiments may be combined to form a new embodiment, implementation, or implementation method according to an internal logical relationship thereof. The foregoing implementations of this application are not intended to limit the protection scope of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A communication apparatus, comprising:
a processor; and
a transceiver, wherein
    the processor is configured to control the transceiver to send first signaling in a first cell to a terminal device,
    the first signaling indicates a second cell in which the terminal device sends uplink control information,
    the uplink control information corresponds to the first cell and a third cell, in a cross-carrier scheduling scenario,
    the third cell is different from the first cell and the second cell, and
    the processor is further configured to control the transceiver to receive the uplink control information in the second cell.

2. The communication apparatus according to claim 1, wherein
    the first cell is included in a first cell group,
    the second cell is included in a second cell group,
    the first signaling includes an identifier of the second cell group, and
    the second cell is a default cell configured in the second cell group for sending the uplink control information.

3. The communication apparatus according to claim 1, wherein
    the first cell is included in a first cell group, and the first cell group is included in at least two cell groups,
    a default cell used by the terminal device to send the uplink control information is configured in each of the at least two cell groups,
    the first signaling includes a first indication, and the first indication indicates the terminal device to send the uplink control information in the first cell group, and the second cell is a default cell configured in the first cell group for sending the uplink control information, or
    the first indication indicates the terminal device to send the uplink control information in a cell group other than the first cell group, and the second cell is a default cell configured in the cell group other than the first cell group for sending the uplink control information.

4. The communication apparatus according to claim 1, wherein
    the first cell is included in a first cell group,
    the first cell group is one of M cell groups,
    the M cell groups comprise N cell pairs,
    one cell pair comprises two cell groups in the M cell groups,
    M is an integer greater than 2, and N is an integer greater than 1, and
    the first signaling comprises a second indication indicating the terminal device to send the uplink control information in the first cell group, and the second cell is a default cell configured in the first cell group for sending the uplink control information, or
    the second indication indicates the terminal device to send the uplink control information in another cell group in a cell pair to which the first cell group belongs, and the second cell is a default cell configured in the another cell group for sending the uplink control information.

5. The communication apparatus according to claim 1, wherein
    the second cell includes at least two active bandwidth parts (BWP),
    the first signaling further includes a BWP identifier, and
    the BWP identifier indicates a BWP in the at least two active BWPs of the second cell and the BWP is for sending the uplink control information.

6. The communication apparatus according to claim 1, wherein
    the processor is further configured to control the transceiver to send second signaling,
    the second signaling indicates a first time-frequency resource configured in the second cell for sending the uplink control information, and
    the first time-frequency resource is different from an initial time-frequency resource configured in the second cell for sending the uplink control information.

7. The communication apparatus according to claim 6, wherein the second signaling is downlink control information (DCI) and/or radio resource control (RRC) signaling, and the first signaling is DCI.

8. The communication apparatus according to claim 1, wherein the first signaling includes an identifier of the third cell.

9. The communication apparatus according to claim 1, wherein the third cell is included in a first cell group or a second cell group.

10. The communication apparatus according to claim 1, wherein the terminal device monitors a channel associated with the second cell, and when the channel is detected as being idle, the second cell is configured for the terminal device to send the uplink control information.

11. The communication apparatus according to claim 1, wherein the first signaling includes downlink control information (DCI), the DCI includes at least a third cell identifier corresponding to the third cell, and the DCI is sent to the terminal device through the first cell.

12. A communication apparatus, comprising:

a processor; and a transceiver, wherein the processor is configured to control the transceiver to receive first signaling in a first cell, the first signaling indicates a second cell in which the communication apparatus sends uplink control information, the uplink control information corresponds to the first cell and a third cell, in a cross-carrier scheduling scenario, the third cell is different than the first cell and the second cell, and the processor is further configured to control the transceiver to send the uplink control information in the second cell.

13. The communication apparatus according to claim 12, wherein the first cell is included in a first cell group, the second cell is included in a second cell group, the first signaling includes an identifier of the second cell group, and the second cell is configured in the second cell group for sending the uplink control information.

14. The communication apparatus according to claim 12, wherein the first cell is included in a first cell group, and the first cell group is in at least two cell groups, a cell used by the communication apparatus to send the uplink control information is configured in each of the at least two cell groups, and the first signaling includes a first indication indicating the communication apparatus to send the uplink control information in the first cell group, and the second cell is a default cell configured in the first cell group for sending the uplink control information, or the first indication indicates the communication apparatus to send the uplink control information in a cell group other than the first cell group, and the second cell is a default cell in the cell group other than the second cell group and for sending the uplink control information.

15. The communication apparatus according to claim 12, wherein the first cell is included in a first cell group, and the first cell group is one of M cell groups, the M cell groups include N cell pairs, one cell pair includes two cell groups in the M cell groups, M is an integer greater than 2, and N is an integer greater than 1, and the first signaling includes a second indication indicating the communication apparatus to send the uplink control information in the first cell group, and the second cell is a default cell configured in the first cell group for sending the uplink control information, or the second indication indicates the communication apparatus to send the uplink control information in another cell group in a cell pair to which the first cell group belongs, and the second cell is a default cell configured in the another cell group for sending the uplink control information.

16. The communication apparatus according to claim 12, wherein the second cell includes at least two active bandwidth parts (BWP), the first signaling further includes a BWP identifier, and the BWP identifier indicates a BWP in the at least two active BWPs of the second cell and the BWP is for sending the uplink control information.

17. The communication apparatus according to claim 12, wherein the processor is further configured to control the transceiver to receive second signaling, the second signaling indicates a first time-frequency resource configured in the second cell for sending the uplink control information, the first time-frequency resource is different from an initial time-frequency resource configured in the second cell for sending the uplink control information, the second signaling is downlink control information (DCI) and/or radio resource control (RRC) signaling, and the first signaling is DCI.

18. The communication apparatus according to claim 12, wherein the first signaling includes an identifier of the third cell.

19. The communication apparatus according to claim 12, wherein the third cell is included in a second cell group.

20. The communication apparatus according to claim 12, wherein the processor is further configured to control the transceiver to monitor a channel and send the uplink control information when the channel is detected as being idle.

* * * * *